United States Patent [19]

Davis

[11] 4,082,387
[45] Apr. 4, 1978

[54] VEHICLE CONSOLE FOR MOUNTING AND ENCLOSING RADIOS AND THE LIKE

[76] Inventor: Thomas R. Davis, 600 S. 45th St., Lincoln, Nebr. 68510

[21] Appl. No.: 715,766

[22] Filed: Aug. 19, 1976

[51] Int. Cl.² .......................... A47B 67/02; B60R 7/00
[52] U.S. Cl. ................................. 312/242; 224/29 R; 248/291; 70/58
[58] Field of Search ........................... 312/242; 70/58; 248/203, 291; 224/42.45 R, 29 R

[56] References Cited

U.S. PATENT DOCUMENTS

| | | | |
|---|---|---|---|
| 1,552,223 | 9/1925 | Murray | 248/291 |
| 1,802,345 | 4/1931 | Heina | 224/29 R |
| 1,898,835 | 2/1933 | Henderson | 224/29 R |
| 2,193,272 | 3/1940 | Crossley | 248/291 |
| 2,248,170 | 7/1941 | Hansen | 224/42.45 R |
| 2,487,731 | 11/1949 | Rosing | 248/203 |
| 2,940,652 | 6/1960 | Willard | 224/42.45 R |
| 3,351,380 | 11/1967 | Sprague | 224/29 R |
| 3,888,096 | 6/1975 | Huss | 70/58 |
| 3,947,954 | 4/1976 | Weiler | 224/29 R |
| 3,994,148 | 11/1976 | Anderson | 248/203 |

*Primary Examiner*—Paul R. Gilliam
*Assistant Examiner*—Victor N. Sakran
*Attorney, Agent, or Firm*—David H. Semmes; Warren E. Olsen

[57] ABSTRACT

A vehicle console for mounting and enclosing radios and the like characterized by a box-like enclosure having a frontwardly facing access opening that is coverable by an access door. The access door is lockable, and outwardly pivotable so that a radio and the like, having frontwardly presented control panels, may be easily adjusted when the door is downwardly opened. The box-like enclosure is pivotable with respect to a bracket that is adapted to be mounted upon an vehicle surface. To ensure secure anti-theft mounting of the bracket to a vehicle surface, square aperture holes are provided in a downwardly disposed flange of the bracket so that the carriage head bolts may be downwardly inserted therethrough, thereby rendering it impossible to remove the mounting bolts from above. In a preferred embodiment the console is particularly adapted for mounting upon the drive shaft tunnel of a vehicle, wherein removal of the carriage bolts necessitates access from beneath the vehicle, in the vicinity of the drive shaft. The console of the present invention significantly provides a lockable box-like enclosure, for such electronic items as CB radios, wherein the provision of knock-outs and vented surfaces of the enclosure even permit transmitting and receiving on the radio while the access door is locked securely in place, leaving a conventional hand microphone attached to an external bracket on the outside of the enclosure.

22 Claims, 9 Drawing Figures

VEHICLE CONSOLE FOR MOUNTING AND ENCLOSING RADIOS AND THE LIKE

BACKGROUND OF THE INVENTION

1. Field of the Invention

This invention relates in general to an anti-theft vehicle console for a secure encompassing mounting for CB radios and the like upon any vehicle surface. The present vehicle console is broadly adaptable to any form of vehicle, and significantly allows an enclosed CB radio to be operated even with the frontwardly open access door in the locked position.

2. Description of the Prior Art

The present vehicle console provides a mounting for a CB radio and the like which is significantly characterized by completely encompassing the radio device with a lockable enclosure. Various other forms of mounting devices have been proposed for portable communications equipment, and representative of various known forms of vehicle-mounted consoles and radio mounts are the following U.S. patents: JOHNSON, U.S. Pat. No. 3,827,771; BOOTHE, U.S. Pat. No. 3,632,158; BASSINGER, U.S. Pat. No. 3,589,577; HANLEY, U.S. Pat. No. 3,500,001; KRECHMAN, U.S. Pat. No. 3,405,944; MILLER, U.S. Design Pat. No. 238,973; WESTMORELAND, U.S. Design Pat. No. 237,134; WICKEL, U.S. Design Pat. No. 228,898;

The patents to Johnson, Boothe, and Hanely collectively illustrate the concept of a theft-resistant vehicle mounting for CB radios and the like. The patent to Johnson illustrates a vehicle mounting arrangement that prevents console removal from above, though the mounting itself does not illustrate a box-like enclosure including the ability to enclose an access door upon the control panels of the radio, while still operating the radio device. The vehicle console of Boothe is adapted to be positioned upon a driving seat, and typifies the external mounting of a communications system externally, and without encompassing structure. The patent to Hanley illustrates a radio mounting wherein the front control panel is titled at a fixed angle, though without the provision for an enclosure as is taught to be a significant characteristic of the presently disclosed invention.

The patents to Bassinger and Krechman illustrate further accessory devices for radios and the like that may be affixed to a portion of the vehicle frame, though without structural or functional relationship to the presently disclosed invention. The design patents to Miller and Wickel illustrate boxes that are specially configured for vehicular application, and particularly for holding articles such as tools. The design patent to Westmoreland illustrates a combined lunch box and radio that is without functional or structural similarity to the lockable vehicle console as taught herein.

The prior art is replete with devices for mounting radios and the like upon vehicle surfaces, though there is found no prior art teaching that recognizes that a CB radio and the like may be completely enclosed within a box-like enclosure, having a frontwardly facing access opening that is coverable by an access door, and locked. The present invention allows operation of a CB radio with the access door either downwardly pivotable upon a horizontally disposed hinge, or with the door locked in its upward position. CB radios conventionally include a transmitting switch on the hand held microphone, where the present invention provides for such a hand microphone to be mounted externally to the box-like enclosure, whereby transmitting may be simply accomplished without need to readjust the controls upon the radio itself. Therefore, the present invention is a basic departure from the attempts of others in that a box-like enclosure is provided which allows for a complete enclosure of a CB radio and the like, while allowing for use of the radio even while the box is still enclosed.

SUMMARY OF THE INVENTION

The present invention is a vehicle console for mounting and enclosing CB radios and the like, and essentially comprises a vertically extending bracket that includes a lower flanged surface for mounting upon a vehicle surface, such as a floor tunnel. The flange itself includes a plurality of apertures for receiving a bolt mounting means, and in a preferred embodiment carriage bolts are disclosed for preventing removal of the bracket from above.

Extending upwardly from the fixed bracket is a bracket extension, with this bracket extension being pivotably mounted to the fixed bracket so that the bracket extension may be angularly positioned about a horizontal axis through the fixed bracket. A housing adapted for enclosing a CB radio and the like is rigidly mounted to an upper surface of the bracket extension, and the pivotable mounting between the bracket extension and the bracket is further disclosed, in a preferred embodiment, to include a tension screw for maintaining a fixed angular position of the superposed housing. The housing further comprises a closed box-like enclosure having a frontwardly facing access opening that is selectively coverable by an access door. The access door, in a preferred embodiment, is downwardly pivotable upon a horizontally disposed hinge, and the door further includes a lock means operable for maintaining the interior of the enclosure secured against unauthorized entry.

Within the interior of the enclosure of the box-like enclosure, there is provided means for mounting CB radios and the like, of the type having frontwardly presenting control panels. The frontwardly presented control panels therefore are positioned for easy access from the frontwardly facing access opening in the box-like enclosure, and the control panels on the radios and the like may be adjusted and then be covered by the lockable access door. In order to resiliently mount the CB radio or the like within the present invention, there is provided at least one fixed anchor proximate one side of the enclosure interior, with a movable anchor means operable to be adjustably spaced from this fixed anchor, towards the other side of the enclosure interior. Since mobile communications systems, such as CB radios, come in various heights and widths, this adjustable anchor arrangement allows for distending an elastomeric strap from the fixed anchor, over the radio to be anchored, and finally anchored upon the movable anchor which has been adjustably positioned to accommodate that particular radio. Furthermore, since it is conventional for CB radios to have a built-in speaker projecting through the bottom surface of the radio, the present resilient mounting means further comprises a U-shaped resilient pad to be disposed between the bottom surface of the radio, and the interior surface of the bottom of the box-like enclosure. This resilient pad is preferably placed so that the open end of the U extends frontwardly, and allows direct communication between the speaker and a plurality of openings in the bottom surface of the enclosure. The present invention further comprehends the provision of vent apertures upon various sides of the box-like enclosure, to allow for cooling air to travel by natural convection around the radio and without the enclosure. Additionally, the present invention contemplates knock-out panels proximate the sides and/or back of the box-like enclosure, so that electrical connections, antenna connections and microphone cable connections are simply accomplished without derogation of the overall integrity of the enclosure when the access door is locked in place. Other objects, features, and advantages of the present invention will become more apparent upon consideration of the following detailed description of the preferred embodiments, with references made to the attached drawings.

DESCRIPTION OF THE PREFERRED EMBODIMENTS

Figure 1:
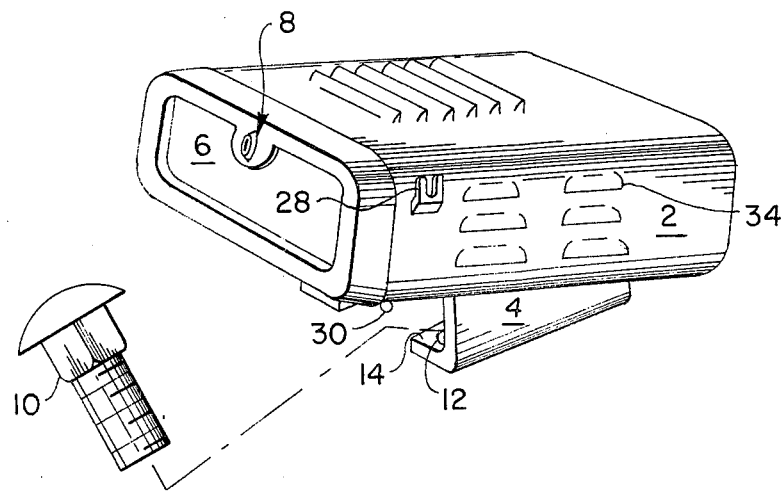
FIG. 1 is a perspective view showing one embodiment according to the present invention.

With reference to the drawings, FIG. 1 illustrates in perspective view one embodiment of a vehicle console for mounting and enclosing radios and the like according to the present invention. The housing for enclosing a radio and the like comprises a closed box-like enclosure 2, wherein said box-like enclosure has a frontwardly facing access opening which is selectively coverable by an access door 6. The access door is hinged upon a horizontally disposed hinge 30, and includes a locking means 8 operable for maintaining the interior of the enclosure closed against unauthorized entry, while yet allowing operation of an enclosed radio and the like, as will become more apparent hereinafter. In the embodiment of FIG. 1 the box-like enclosure 2 is supported upon a vertically extending bracket 4 that has a lower flange surface 14. The vertically extending bracket 4 in FIG. 1 is shown to include a plurality of apertures, one being indicated at 12, for receiving a mounting means for mounting the lower flange 14 upon a vehicle surface. In the preferred embodiment the plurality of vehicle mounting apertures 12 are substantially square, to allow for a carriage bolt 10 to be held against rotation when inserted downwardly through one of the apertures 12.

In the embodiment of FIG. 1, the vertically extending bracket comprises a pair of vertically extending brackets, wherein each vertically disposed bracket side is proximate respective left and right sides of the box-like enclosure 2. The box-like enclosure 2 is rigidly mounted to an upper surface of the bracket 4, such as by spot welding or the like. As further shown in FIG. 1, the present vehicle console for mounting and enclosing radios and the like, further includes vents through at least one of the surfaces of the box-like enclosure. In FIG. 1 vents are illustrated on the right side of the box-like enclosure 2, and are shown to be elongated louvered vents identified by the numeral 34. Any other form of venting, such as simple drilled holes is contemplated according to the principles of the present invention wherein the purpose of these vents 34 are to allow for natural convective cooling of the electronic device disposed within the enclosure. Also shown in FIG. 1 is an external microphone hand set mounting bracket 28, with this hand set bracket 28 being disposed on the right side of the closed box-like enclosure 2. In the embodiment of FIG. 1, the bracket 4 shown for supporting the box-like enclosure 2 has a fixed angle orientation about a horizontal axis. The present invention is adapted for use upon a plurality of vehicle surfaces, wherein the term vehicle contemplates automobiles, trucks, tractors, boats, and the like. For widest vehicle application, the preferred embodiments includes adjustable angular positioning of the enclosure about a horizontal axis.

Figure 2:
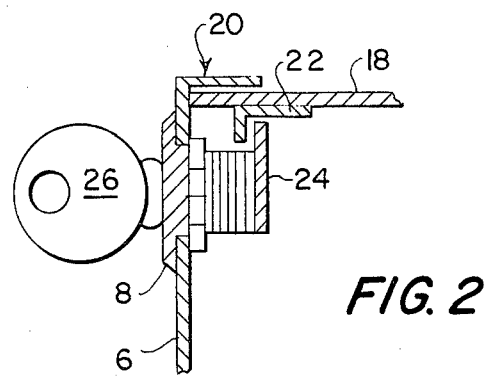
FIG. 2 is a partial section showing a detail of a locking means according to the present invention.

FIG. 2 illustrates, schematically, how a lock may be interposed on the upper edge of the access door 6, such that the frontwardly facing access opening in the box-like enclosure 2 is easily and securely coverable by the access door, so as to maintain the interior of the enclosure closed against unauthorized entry. The locking mechanism 8 comprises a cylinder having a locking member 24 which is displaceable to engage the inner surface of a lock detent 22, with this lock detent 22 securely extending downwardly from the interior of the upper surface of the box-like enclosure 18. The access door 6 is further shown with a flange 20 which may further include an environmental seal, such as a gasket, as is conventionally known. While a schematic illustration for a key is shown at 26, any form of tooth or circular key device is contemplated, and since locks for this purpose are well known, further illustration of a locking device is not considered necessary.

Figure 3:
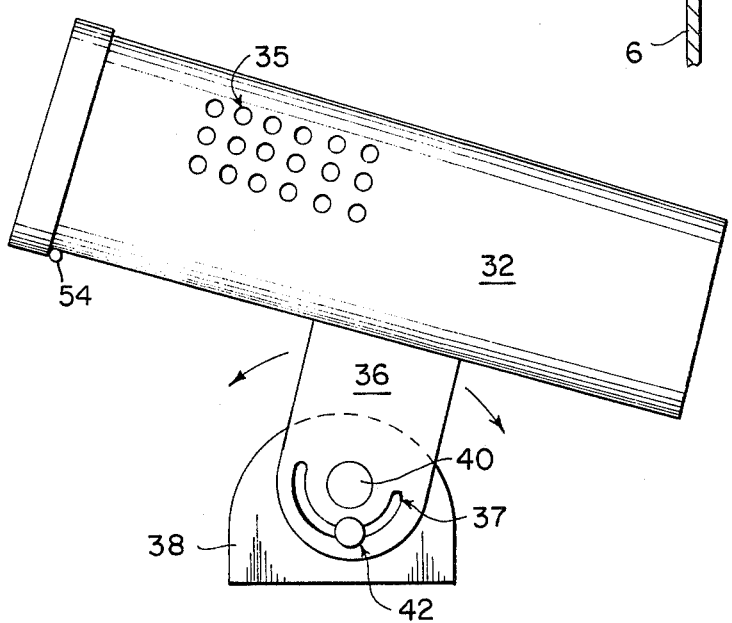
FIG. 3 is a side view showing a preferred embodiment according to the present invention.
Figure 4:
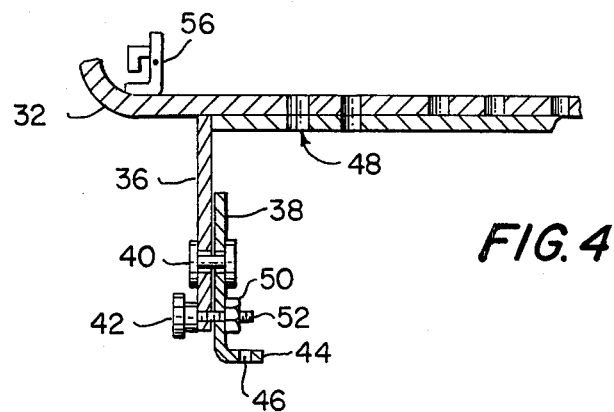
FIG. 4 is a partial section view of the embodiment of FIG. 3.

FIG. 3 illustrates a second embodiment of the invention illustrated in FIG. 1, insofar as the embodiment of FIG. 3 illustrates a bracket 38 together with a bracket extension 36 to allow for an angular positioning of a box-like enclosure 32 about a horizontal axis. The horizontal axis for this pivoting is along the centerline of the rivet 40, as is shown in FIG. 4. The box-like enclosure 32 further includes a frontwardly facing access door which is hinged about a horizontally disposed hinge, 54, and a variant on vent openings from that shown in FIG. 1 is further illustrated by the plurality of vents 35. The bracket extension 36 extends upwardly from the vertically extending bracket 38 and an upward surface of the bracket extension 36 is rigidly mounted to the housing 32. To control the amount of angular movement of the housing 32, there is provided an arcuate channel 37 which has a center of curvature coincident with the horizontal axis through the rivet 40. The arcuate channel 37 is preferably between 90° and 180° of rotation around the rivet 40, in this preferred embodiment. A tension screw 42 is shown disposed within the arcuate channel 37 so as to tension the bracket extension 36 against the bracket 38 through an inward progress of the screw thread 52 through a nut-like member 50. It should be noted that removal of the tension screw 42 in no way impairs the integrity of the connection between the bracket extension 36 and the vertically extending bracket section 38 since the rivet 40 securely maintains the connection between these members. Details of this pivoting arrangment are shown in FIG. 4, for only one of the vertically extending bracket extension assemblies, and one or more additional pivoting bracket arrangements may be employed without departing from the present invention. For example, in FIG. 4 it is illustrated that the vertically extending bracket 38 is proximate the left side of the box-like enclosure 32, and a similarly disposed pivoting bracket may be vertically disclosed proximate the right side of the box-like enclosure 32. Also shown in FIG. 4 is the provision of a fixed anchor 56 proximate one side of the enclosure interior. This anchor 56 as shown is preferably rigidly attached to the bottom surface of the box-like enclosure 32, and the bottom of the box-like enclosure 32 is further illustrated to have a series of apertures 48 for a purpose which will now be more completely described.

Figure 5:
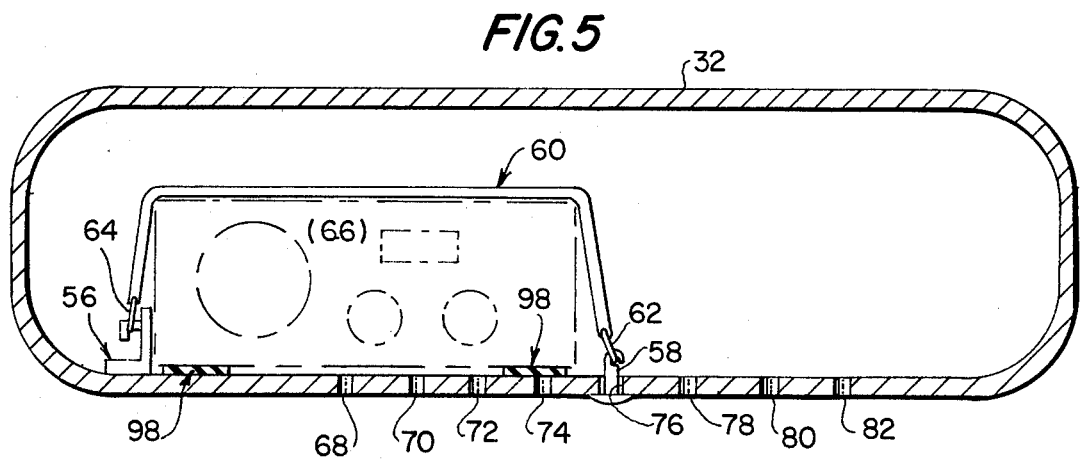
FIG. 5 is a frontward view of a CB radio mounted according to the principles of the present invention.
Figure 6:
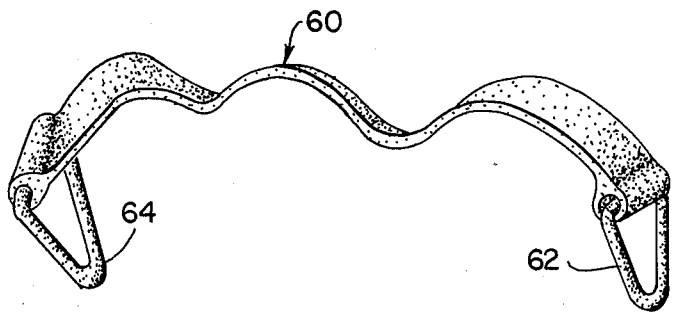
FIGS. 6, 7 and 9 are details of resilient mounting of the radio within a device according to the present invention.
Figure 7:
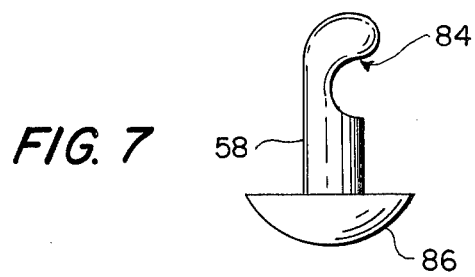
Figure 9:
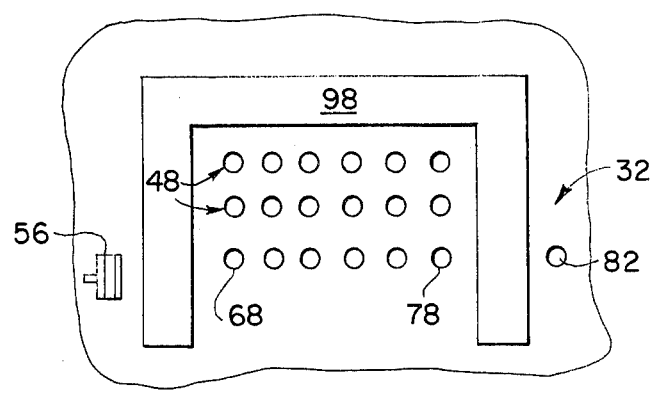

FIG. 5 illustrates one significant feature of the present invention to be a manner of mounting of a radio, such as a CB radio 66, shown in phantom, within an enclosure 32. This enclosure mounting is equally applicable to the box-like enclosure 2, as shown in FIG. 1, and consists of the fixed anchor 56, and a movable anchor 58 that is operable to be adjustably spaced from the fixed anchor 56. Between the two anchors, 56 and 58, there is shown an elastomeric strap 60 which is operable to be extended from the fixed anchor, over the radio 66, and secured to the movable anchor 58. For this respective securing to the two anchors, a D-ring 62 may be disposed on one end of the elastomeric strap 60 and a similar form of D-ring 64 disposed at the other end. With reference to FIG. 5, there is shown a plurality of openings 68-82 disposed in the bottom surface of the box-like enclosure 32. The movable anchor 58 has an anchor head at its proximate end that is larger than each of the plurality of apertures 68-82, and a hook at its distal end smaller than the diameter of each of said apertures. A preferred configuration for a movable anchor 58 is shown at FIG. 7 wherein the movable anchor 58 includes a hook 84 at its distal end, with an anchor head 86 at its proximate end. Again with reference to FIG. 5, the movable anchor 58 may be positioned at any one of the plurality of apertures extending through the bottom surface of the enclosure, to accommodate various sizes of radios, such as shown in phantom at 66. The apertures 68-82 are illustrated to be in spaced relation away from the fixed anchor, and these plurality of apertures may also serve as a plurality of openings adapted to allow a sound communication between the bottom of the radio 66 and the region external and below the bottom surface of the enclosure. Conventional CB radios, for example, include an outward projecting speaker through the bottom of the radio and the present invention provides for accommodating various sized CB radios while allowing the plurality of apertures for the movable anchor to also function as a sound passing structure. Of course, a number of elastomeric straps, such as the strap schematically shown at 60 in FIG. 6, may be disposed to secure the exemplary CB radio 66, of FIG. 5, resiliently against the bottom of the enclosure exterior. Again with reference to FIG. 5, the resilient radio mounting means further contemplates an elastomeric spacing between the bottom of the radio 66 and the lower interior surface of the enclosure. As shown in FIG. 9, this elastomeric spacer may comprise a U-shaped pad, 98 wherein the pad may be operably disposed with its open edge facing forwardly while maintaining the bottom of the radio 66 resiliently cushioned against the bottom of the box-like enclosure 32. As shown further in FIG. 9, this resilient spacer 98 provides for sound communication external to the bottom of the box-like housing 32, either through the plurality of openings 48, or the plurality of apertures, for example 68, and 82.

Figure 8:
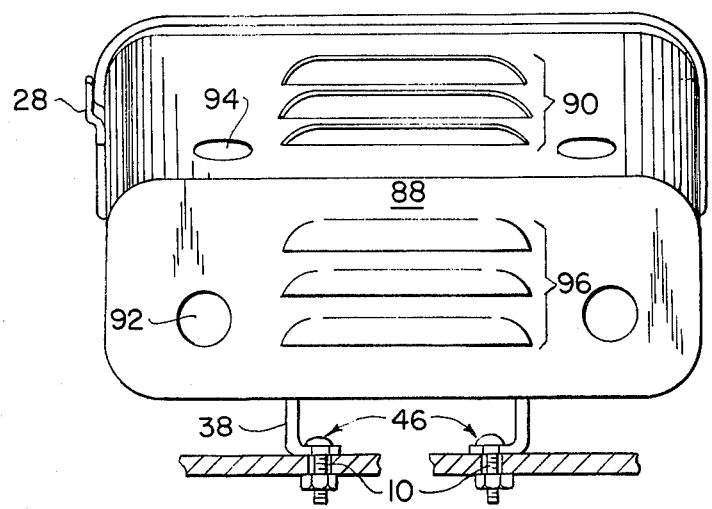
FIG. 8 is a rear view showing further features of the present invention.

As shown in FIG. 8, the box-like enclosure includes a rearwardly facing surface 88, which may be provided with a plurality of vents 96. Additionally, the upper surface of the box-like enclosure is shown provided with a plurality of vents 90. On the right-most surface of the box-like enclosure is shown a microphone hand set mounting bracket 28, which allows for external mounting of the microphone hand set whether or not the access cover is in the locked position. This advantageous feature is ensured by the provision of a number of knock-out panels which are disposed upon at least one of the surfaces of the box-like enclosure. A knock-out panel 92 is shown on the rear surface of the box-like enclosure, 88, and another knock-out panel 94 is shown disposed on the upwardly facing portion of the box-like enclosure. These knock-out panels may be selectively removed for making, for example, an electrical communication between a microphone hand set supported upon a bracket 28 and the CB radio within the device. Other of the knock-out panels may be selectively removed so to provide an electrical power communication to the radio disposed therein, or electric communication between an external antenna and the radio disposed therewithin. As further shown in FIG. 8, there is a pair of mounting brackets vertically disposed supporting the device upon a vehicle surface, with two carriage bolts 10 positioned to a pair of square holes 46, to be thereby held against rotation upon the securing of a nut to a downward end of the carriage bolts 10.

In use, it is clear that a CB radio may be operated after the frontwardly disposed controls on the radio have been set, simply by energizing the microphone hand set which is externally mounted upon a bracket as at 28. It is known that CB radio operators tend to monitor a single channel, and the present invention allows for the CB radio to be turned on and set to a single channel, adjusted for appropriate squelch and fine tuning parameters, and thereafter totally enclosed by the front access door. Even with the front access door closed, an operator can constantly monitor the channel because of the sound communication provided through the box-like enclosure even with the access door in the locked position. If the operator desires to transmit, he simply removes the microphone handset from its external support bracket, 28, and activates the transmission button on the microphone handset, all without the necessity of opening the closed access door.

Having now described certain embodiments according to the principles of the present invention, it is understood that my invention is to be limited solely to the scope of the appended claims.

I claim:

1. A vehicle console for mounting and enclosing radios and the like, comprising:
   A. a vertically extending bracket having a lower flange surface for mounting upon a vehicle surface, said flange including a plurality of apertures for receiving a vehicle mounting means; and
   B. a bracket extension upwardly extending from said vertically extending bracket, said extension being pivotably mounted to said bracket for an angular positioning of said extension about a horizontal axis; and C. a housing for enclosing a radio and the like rigidly mounted to an upper surface of said bracket extension wherein said housing further comprises a closed box-like enclosure having a frontwardly facing access opening coverable by an access door, said door being downwardly pivotable upon a horizontally disposed hinge, said door including a lock means operable for maintaining the interior of said enclosure closed against unauthorized entry; and D. means within the interior of said enclosure operable for mounting radios and the like, having frontwardly presenting control panels, therewithin, said mounting means being adapted to maintain said radio resiliently in contact with said housing interior through an elastomeric spacer between the bottom of said radio and the lower interior surface of said enclosure, wherein said radio mounting means further comprises a fixed anchor proximate one side of said enclosure interior, a movable anchor means operable to be adjustably spaced from said fixed anchor, and an elastomeric strap operable to extend from said fixed anchor, over said radio, to said movable anchor means.

2. A vehicle console as in claim 1 wherein said movable anchor means further comprises a plurality of apertures extending through the bottom surface of said enclosure in spaced relation away from said fixed anchor, a movable anchor having an anchor head at its proximate end that is larger than each of said plurality of apertures and a hook at its distal end that is smaller than said apertures, wherein said distal end is adapted to extend within said enclosure, through any of said apertures, and engage one end of said elastomeric strap.

3. A vehicle console as in claim 1 wherein said elastomeric spacer comprises a U-shaped pad, said pad being operably disposed with its open edge forwardly disposed.

4. A vehicle console, as in claim 1 wherein said plurality of apertures for receiving a mounting means comprises a plurality of substantially square apertures, and said vehicle mounting means comprises at least one carriage bolt which is adapted to be downwardly inserted into one of said square holes and held therein against rotation upon the securing of a nut to the downward end of said carriage bolt.

5. A vehicle console, as in claim 1, wherein said pivotable mounting of said bracket extension further comprises a pair of vertically extending brackets, each vertically disposed proximate respective left and right sides of said box-like enclosure, and a bracket extension pivotably mounted to each of said brackets through a rivet, said rivets being horizontally disposed on said horizontal axis.

6. A vehicle console as in claim 5 wherein said pivotable mounting further comprises an arcuate channel in each of said bracket extensions, said arcuate channel having a center of curvature coincident with said horizontal axis, and a tension screw disposed within said arcuate channel and adapted to adjustably tension said bracket relative to said bracket extension for a desired angular positioning of said housing.

7. A vehicle console as in claim 1 wherein said box-like enclosure includes vents through at least one of the surfaces of said box-like enclosure.

8. A vehicle console as in claim 7 wherein said vents are disposed on the upper surface of said box-like enclosure.

9. A vehicle console as in claim 8 wherein a plurality of openings are disposed on the bottom surface of said box-like enclosure.

10. A vehicle console as in claim 9 wherein said plurality of openings are adapted to allow a sound communication between the bottom of a radio and the like and the region below the bottom surface of said enclosure.

11. A vehicle console as in claim 1 wherein knock-out panels are disposed upon at least one of the surfaces of said box-like enclosure, said knock-out panels being adapted to allow external electrical connections to the interior of said enclosure.

12. A vehicle console as in claim 11 wherein said box-like enclosure further includes an external bracket operable to support a microphone hand set that is in electrical communication to a CB radio within said enclosure through a removal of one of said knock-out panels.

13. A vehicle console for mounting an enclosing radios and the like, comprising:

A. a vertically extending bracket having a lower flange surface for mounting upon a vehicle surface, said flange including a plurality of apertures for receiving a vehicle mounting means; and B. a housing for enclosing a radio and the like rigidly mounted to an upper surface of said bracket, wherein said housing further comprises a closed box-like enclosure having a frontwardly facing access opening coverable by an access door, said door being selectively openable with respect to said access opening, said door including a lock means operable for maintaining the interior of said enclosure closed against unauthorized entry; and c. means within the interior of said enclosure operable for resiliently mounting radios and the like, having frontwardly presenting control panels, wherein said radio mounting means further comprises an elastomeric spacer between the bottom of said radio and the lower interior surface of said enclosure, a fixed anchor proximate one side of said enclosure interior, a movable anchor means operable to be adjustably spaced from said fixed anchor, and an elastomeric strap operable to extend from said fixed anchor, over said radio, to said movable anchor means.

14. A vehicle console as in claim 15, wherein said movable anchor means further comprises a plurality of apertures extending through the bottom surface of said enclosure in spaced relation away from said fixed anchor, a movable anchor having an anchor head at its proximate end that is larger than each of said plurality of apertures and a hook at its distal end that is smaller than said apertures, wherein said distal end is adapted to extend within said enclosure, through any of said apertures, and engage one end of said elastomeric strap.

15. A vehicle console as in claim 15 wherein said elastomeric spacer comprises a U-shaped pad, said pad being operably disposed with its open edge forwardly disposed.

16. A vehicle console, as in claim 13 wherein said plurality of apertures for receiving a mounting means comprises a plurality of substantially square apertures, and said vehicle mounting means comprises at least one carriage bolt which is adapted to be downwardly inserted into one of said square holes and held therein against rotation upon the securing of a nut to the downward end of said carriage bolt.

17. A vehicle console as in claim 13 wherein said box-like enclosure includes vents through at least one of the surfaces of said box-like enclosure.

18. A vehicle console as in claim 17 wherein said vents are disposed on the upper surface of said box-like enclosure.

19. A vehicle console as in claim 18 wherein a plurality of openings are disposed on the bottom surface of said box-like enclosure.

20. A vehicle console as in claim 19 wherein said plurality of openings are adapted to allow a sound communication between the bottom of a radio and the like and the region below the bottom surface of said enclosure.

21. A vehicle console as in claim 13 wherein knock-out panels are disposed upon at least one of the surfaces of said box-like enclosure, said knock-out panels being adapted to allow external electrical connections to the interior of said enclosure.

22. A vehicle console as in claim 21 wherein said box-like enclosure further includes an external bracket opeable to support a microphone handset that is in electrical communication to a CB radio within said enclosure through a removal of one of said knock-out panels.

* * * * *